(12) United States Patent
Hu

(10) Patent No.: US 6,574,190 B1
(45) Date of Patent: Jun. 3, 2003

(54) COIL-ON-BLOCK DESIGN WITH REDUCED PARTICLE ACCUMULATION ON MO DISC DRIVES

(75) Inventor: Yong Hu, Fremont, CA (US)

(73) Assignee: JPMorgan Chase Bank, New York, NY (US)

( * ) Notice: Subject to any disclaimer, the term of this patent is extended or adjusted under 35 U.S.C. 154(b) by 0 days.

(21) Appl. No.: 09/270,812

(22) Filed: Mar. 17, 1999

(51) Int. Cl.[7] .............. G11B 17/32; G11B 5/60
(52) U.S. Cl. ................. 369/300; 360/236.6
(58) Field of Search ............. 369/13, 300, 13.32, 369/13.28, 44.22, 13.23, 13.54, 13.17; 360/236.4, 236.6, 237, 235.4, 236.8, 236.5, 236.7, 236.2, 236.1, 234.3

(56) References Cited

U.S. PATENT DOCUMENTS

| | | | |
|---|---|---|---|
| 4,633,450 A | | 12/1986 | Gueugnon ............ 369/13 |
| 4,893,207 A | | 1/1990 | Maury et al. ............ 360/114 |
| 5,353,180 A | * | 10/1994 | Murray ............... 360/103 |
| 5,677,812 A | | 10/1997 | Cha .................. 360/103 |
| 5,986,850 A | * | 11/1999 | Wang et al. ............ 369/300 |
| 6,115,329 A | * | 9/2000 | Hu ................... 369/13 |
| 6,130,863 A | * | 10/2000 | Wang et al. ............ 369/13 |
| 6,181,519 B1 | * | 1/2001 | Kim .................. 360/236.6 |
| 6,230,380 B1 | * | 5/2001 | Wang et al. ............ 29/90.01 |
| 6,262,970 B1 | * | 7/2001 | Hu ................... 369/300 |
| 6,275,467 B1 | * | 8/2001 | Wang et al. ............ 369/300 |
| 6,292,332 B1 | * | 9/2001 | Peng ................. 360/236.8 |

FOREIGN PATENT DOCUMENTS

| EP | 0 518 566 | 12/1992 |
|---|---|---|
| EP | 0 652 552 | 5/1995 |
| JP | 08 273183 | 10/1996 |

* cited by examiner

Primary Examiner—Ali Neyzari (57) ABSTRACT

The air bearing design consists of four rectangular pads. Each pad features an open rectangular pocket located at the corner of the leading and inner (closer to the disc ID) edges. The pocket opens towards the slider's leading and inner edges. The increase in linear velocity from ID to OD dictates that the slider flies lower at ID than OD. The introduction of the open pocket can effectively offset the difference due to the linear velocity. As we move from ID to OD, the steps that the skewed airflow encounters change from the forward to reverse. Consequently, the lifting force generated by the air compression at the forward steps decrease, while the suction force produced by the air expansion at the reverse step increases, reaching a maximum at OD. Both of them offset the effect of the linear velocity, yielding a constant fly height profile from ID to OD. In addition, the open pockets toward the inner edge generate more air bearing compression for the incoming side flow, improving the ramp-loading dynamic stability under large roll static attitude. The open pocket can be either a step or ramp surface, and the number of pads can be varied. The air bearing design is scalable to achieve different fly heights.

19 Claims, 8 Drawing Sheets

COIL-ON-BLOCK DESIGN WITH REDUCED PARTICLE ACCUMULATION ON MO DISC DRIVES

FIELD OF THE INVENTION

The present invention relates to disc drive storage systems, and more particularly to an improved air bearing slider for use with a rotary actuator in a disc drive.

BACKGROUND OF THE INVENTION

Information storage technology and the storage capacity available therefrom has been historically limited by a number of factors. A typical prior art Winchester magnetic storage system includes a magnetic head that has a slider element and a magnetic read/write element and is coupled to a rotary actuator magnet and coil assembly by a suspension actuator arm so as to be positioned over the surface of a spinning magnetic disc. In operation, lift forces are generated by aerodynamic interaction between the magnetic head and the spinning magnetic disc. The lift forces are opposed by spring forces applied by the suspension so that a predetermined flying height is hopefully maintained over a full radial stroke of the radial actuator assembly above the surface of the spinning magnetic disc. Such conventional magnetic heads are constrained by the theoretical limit on the ability to closely pack adjacent magnetic bits on the disc surface and still accurately recover and read each bit of information.

To address this problem, much research is being done in the development of magneto-optical (MO) storage technology which provides a higher areal density. During conventional writing of information in MO disc drives, an incident laser beam heats a selected spot of interest on the MO disc to approximately the Curie point. A time varying vertical bias magnetic field is used to define a pattern of "up" or "down" magnetic domains in a recording layer. Subsequently, as the selected spot of interest cools, information is recorded on the MO disc. The size of the magnetic field that is generated provides a lower limit on a maximum data density that may be recorded on the MO disc. Information access in the MO storage system in turn is limited by the size of the optical spot to which an incident laser beam may be focused on the disc surface. Magneto-optical information access requires the use of polarized laser light for reading and writing information on an MO disc. To read information, MO technology makes use of a magneto-optical effect (Kerr effect). To detect a modulation of polarization rotation imposed on the linearly polarized incident laser beam by the recorded domain marks in the recording layer. The polarization rotation (representing the information stored at recorded marks or in the edges of the recorded marks) is embodied in a reflection of the linearly polarized laser beam and is converted by optics and electronics for readout.

It is apparent that an important factor in the ability to accurately read and write information from an MO disc, as well as to rapidly access different storage tracks on the MO disc is the design of the flying head, which carries the various components required for accessing magneto-optical information. The illumination of a memory location on the disc by a very fine spot size is essential to the system operation.

However, the spot is projected through a very small opening in a coil or lens holder onto the disc. This opening, over time, may collect dirt or other particles which would diffuse or obscure the light spot. This is because the slider, which is the primary part of the flying head which controls the flying characteristics, typically includes a pair of side rails which are positioned along its side edges and are disposed about a recessed area. These side rails form a pair of air bearing surfaces. The part of the optics assembly which directs the light beam onto the disc is located behind one side rail. As the disc rotates, the disc drags air under the slider and along the air bearing surfaces in a direction approximately parallel to the tangential velocity of the disc. As the air passes beneath the side rails, the compression by the air bearing surfaces causes air pressure between the disc and the air bearing surfaces to increase, which creates a hydrodynamic lifting force that causes the slider to lift and fly above the disc surface. Since the small particles and other contaminants tend to follow the air bearing flow field, they could enter the region behind the air bearing surface and be brought into contact with the path along which the light beam travels, clouding or clogging the path.

SUMMARY OF THE INVENTION

Therefore, a basic object of the invention is to provide an air bearing slider which has improved utility in an MO disc.

A related objective of the invention is to provide an air bearing slider which is especially useful for data access in a magneto-optical storage system.

A further objective of the invention is to provide an air bearing slider (ABS) which has improved access to the data stored in a disc storage system by providing a clear path for light to the disc, free of the light being obscured by debris and other contaminants.

Yet another objective of the invention is to provide an air bearing slider which includes means for shaping the air flow path to divert dirt and contaminants from the light path.

These and other objectives for the air bearing slider design are achieved by utilizing a slider which mounts the output section of the optics behind one slider rail in a unique fashion to shape the air flow path past the optics assembly output section. The output optics are normally mounted on a rectangular platform of about the width of a rail, as improved herein, the optics are mounted on a platform which is a semi-circle, with the curve facing that rear of the rail but separated by a gap. The curved platform diverts the air flow which fills in behind the slider rails, with the majority of the air flow passing beside the platform so that few contaminants can impede the optical path.

Other features and advantages of the present invention will be better understood by reference to the following figures and the detailed description of an exemplary embodiment given below in conjunction with these figures.

DETAILED DESCRIPTION OF A PREFERRED EMBODIMENT

Figure 1:
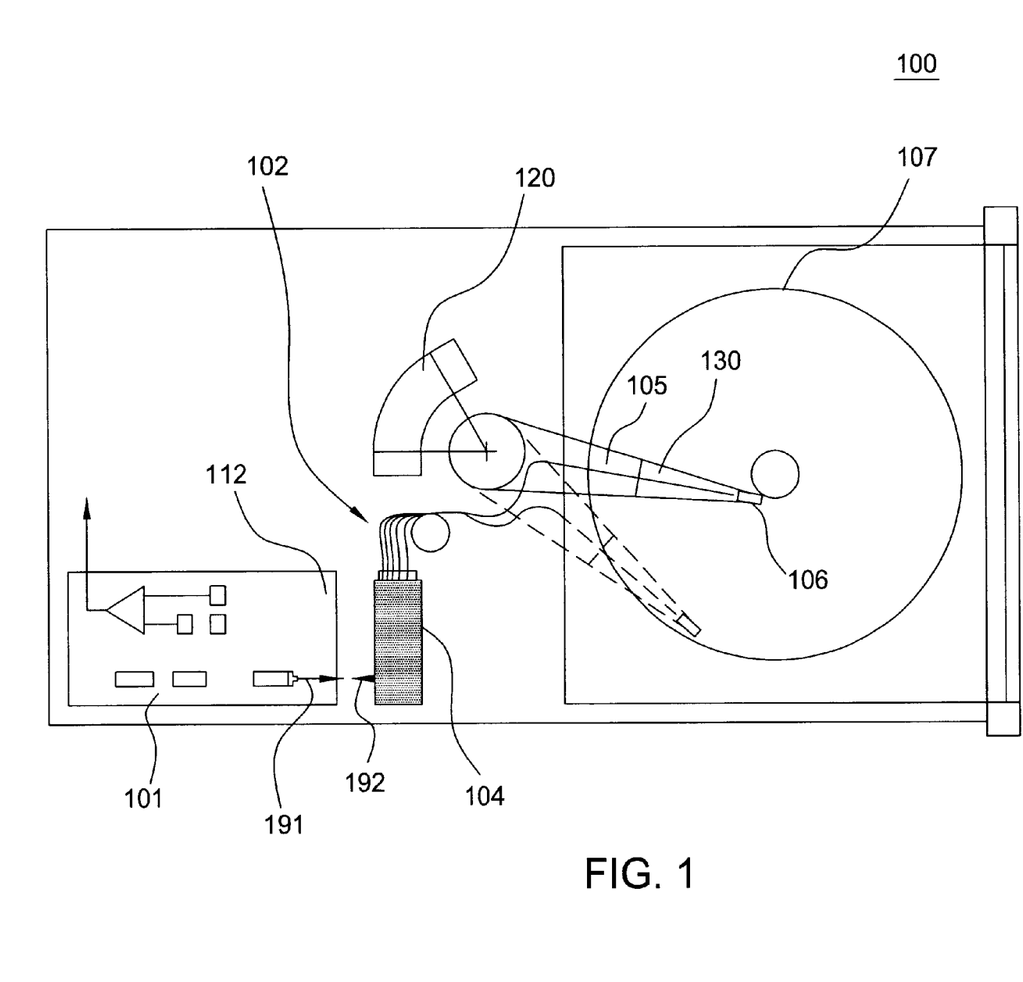
FIG. 1 is a plane view of a magneto-optical data storage system in which the present invention is useful.

Referring now in detail to the drawings, wherein similar parts of the invention are identified by like reference numerals, there is seen in FIG. 1 a plan view showing a typical magneto-optical data storage and retrieval system in which the present invention is useful. Of course, the slider disclosed and discussed below is not limited to use in such a magneto-optical storage system.

The embodiment of FIG. 1 shows a magneto-optical (MO) data storage and retrieval system 100 which includes a set of Winchester-type flying heads 106 that are adapted for use with a set of double sided MO discs 107. The set of flying heads 106 which are carried on the slider which is the subject of this invention are coupled to a rotary actuator magnet and coil assembly 120 by a suspension 130 and an actuator arm 105 to be positioned over the surfaces of the set of MO discs 107. In operation, the MO discs 107 are rotated by a spindle motor to generate aerodynamic lift forces between the sets of flying MO heads 106 and the disc surface, and to maintain the head in a flying condition above the upper and lower surfaces of the discs 107. The lift forces are opposed by equal and opposite spring forces applied by suspensions 130 as is well known in this technology. During non-operation, the MO heads are maintained statically in a storage condition away from the surfaces of the discs 107; they may rest in a landing zone at the ID of the disc surface, or on a ramp 131 which typically is at the OD of the disc surface.

System 100 further includes a laser optic assembly 101, an optical switch 104, and a set of single mode PM (polarization maintaining) optical fibers 102. In the exemplary embodiment, each of the set of single mode PM optical fibers 102 are coupled through a respective one of the set of actuator arms 105 and suspension 130 to a respective one of the set of flying MO heads 106.

Figure 2:
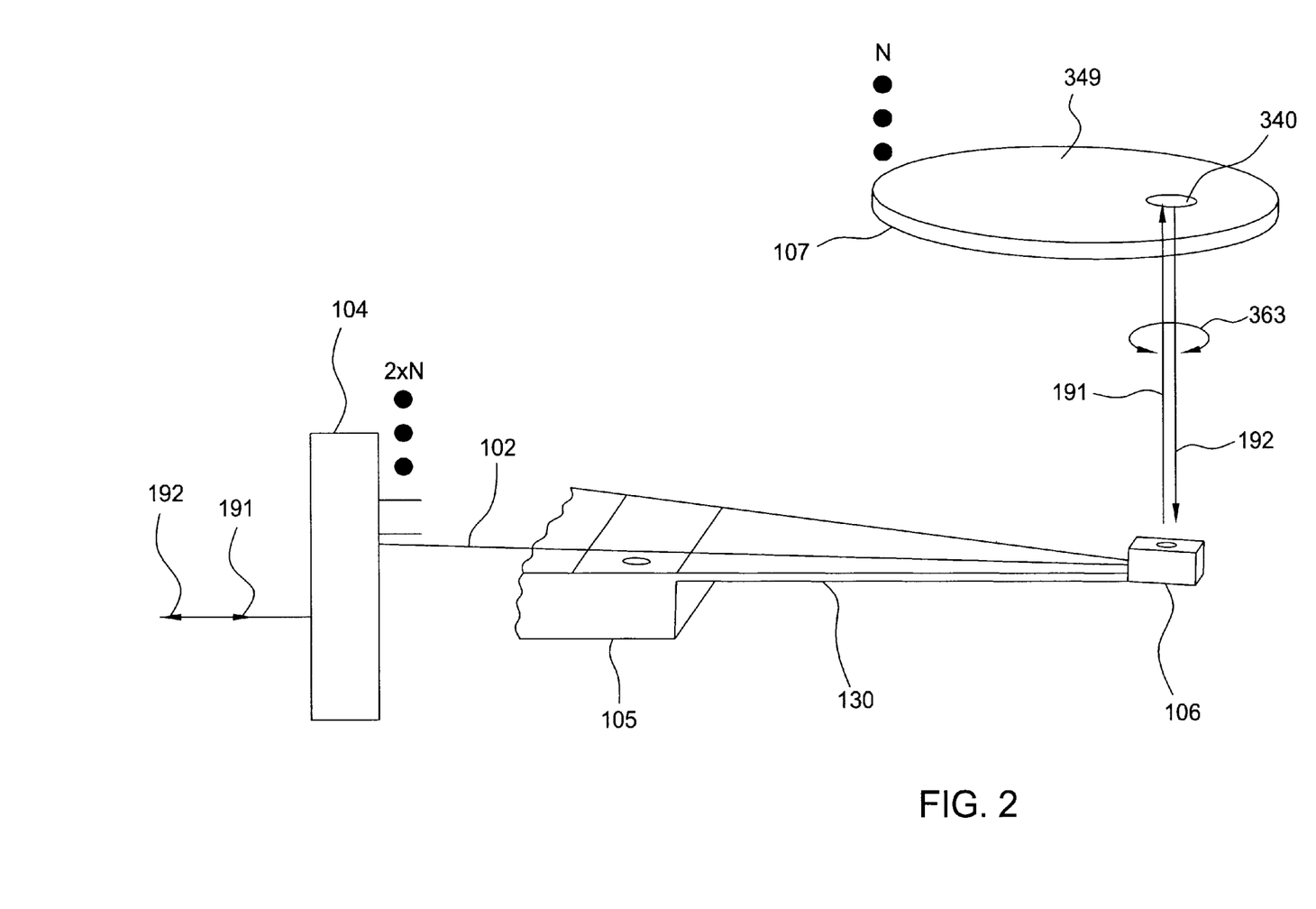
FIG. 2 is a diagram showing in simplified form a representative optical path using an optical fiber which is supported on the suspension to reach one of the flying MO heads in the system of FIG. 1.
Figure 3:
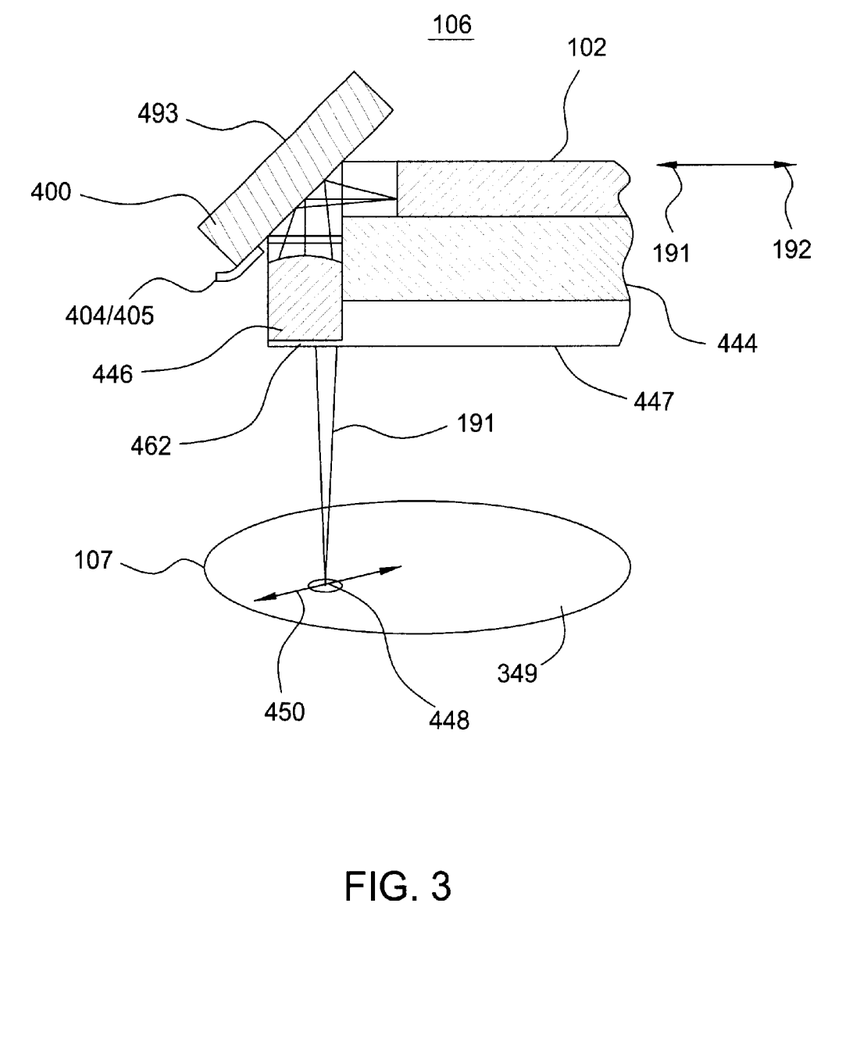
FIG. 3 is a vertical sectional view of the basic elements of a flying magneto-optical head supported on a slider for use in an MO data storage system.

FIG. 2 is a diagram showing in very simplified form a representative optical path utilizing a optical fiber 102 which is supported on the suspension 130 to reach one of the flying MO heads 106. An optical switch 104 provides for directing an outgoing laser beam 191 toward a respective proximal end of the PM optical fiber 102. The outgoing laser beam 191 is directed by the optical fiber 102 to exit at a respective distal end to pass through the flying MO head 106 onto a recording storage layer of a disc 107 associated with the flying head. Other details of the reading and writing operation associated with this optical fiber and optical switch may be found in an application entitled "MAXIMUM DATA STORAGE FOR MAGNETO-OPTICAL SYSTEM", U.S. Ser. No. 08/844,208 filed Apr. 18, 1997, assigned to the Assignee of the present invention and incorporated herein by reference. The above FIGS. 2 and 3 are provided to illustrate the importance of quickly moving the flying head 106 to a selected position over the surface of the associated disc 107 and maintaining that head at a stable position and at a stable height over the surface of the disc while information is written to and read from the surface of the disc. The use of this slider is clearly not limited to any single configuration of head, arm and disc.

FIG. 3 is a vertical sectional view of the basic elements of a flying magneto-optical head of an MO data storage system, the head being of a type generally speaking which would be supported by the slider of this invention. The flying head 106 is shown for use above a recording storage layer 349 of one MO disc 107. The MO head 106 includes in part a slider body 444 having an air bearing surface 447; a quarter waveplate 493, a reflective substrate 400 and objective optics 446 which are used to focus the light beam on the surface of the disc; and a magnetic coil 460 and a yoke 462 which are used to establish the magnetic field which is necessary for accessing data on the disc surface. The slider body 444 is dimensioned to establish the working distance between the objective optics, the optical fiber 102 and the reflective substrate 400. The reflective substrate 400 may also include a reflective surface which is aligned by electrodes 404, 405 to direct the outgoing laser beams 191 to and from the storage layer 349. It is apparent from a review of this figure that the slider must be capable of carrying a substantial amount of structure and supporting it in a stable fashion while flying over the surface of the disc, without collecting particles or lubrication that impinge on the optical path. It is for this reason that the slider body and optical support of this invention shown in the succeeding figures has been designed and adopted.

Figure 4A:
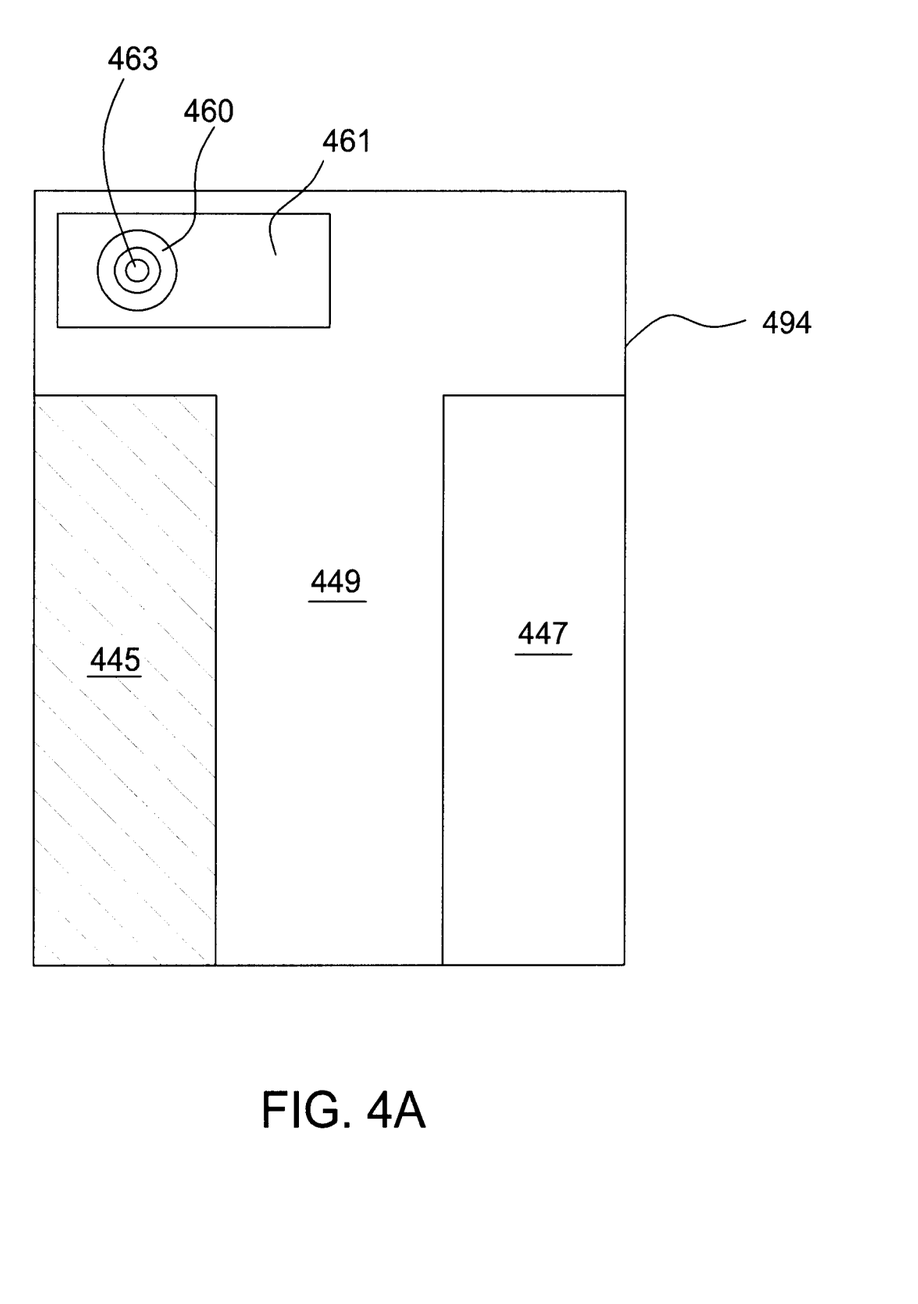
FIG. 4A is a perspective view of a prior art twin rail glide head design.
Figure 4B:
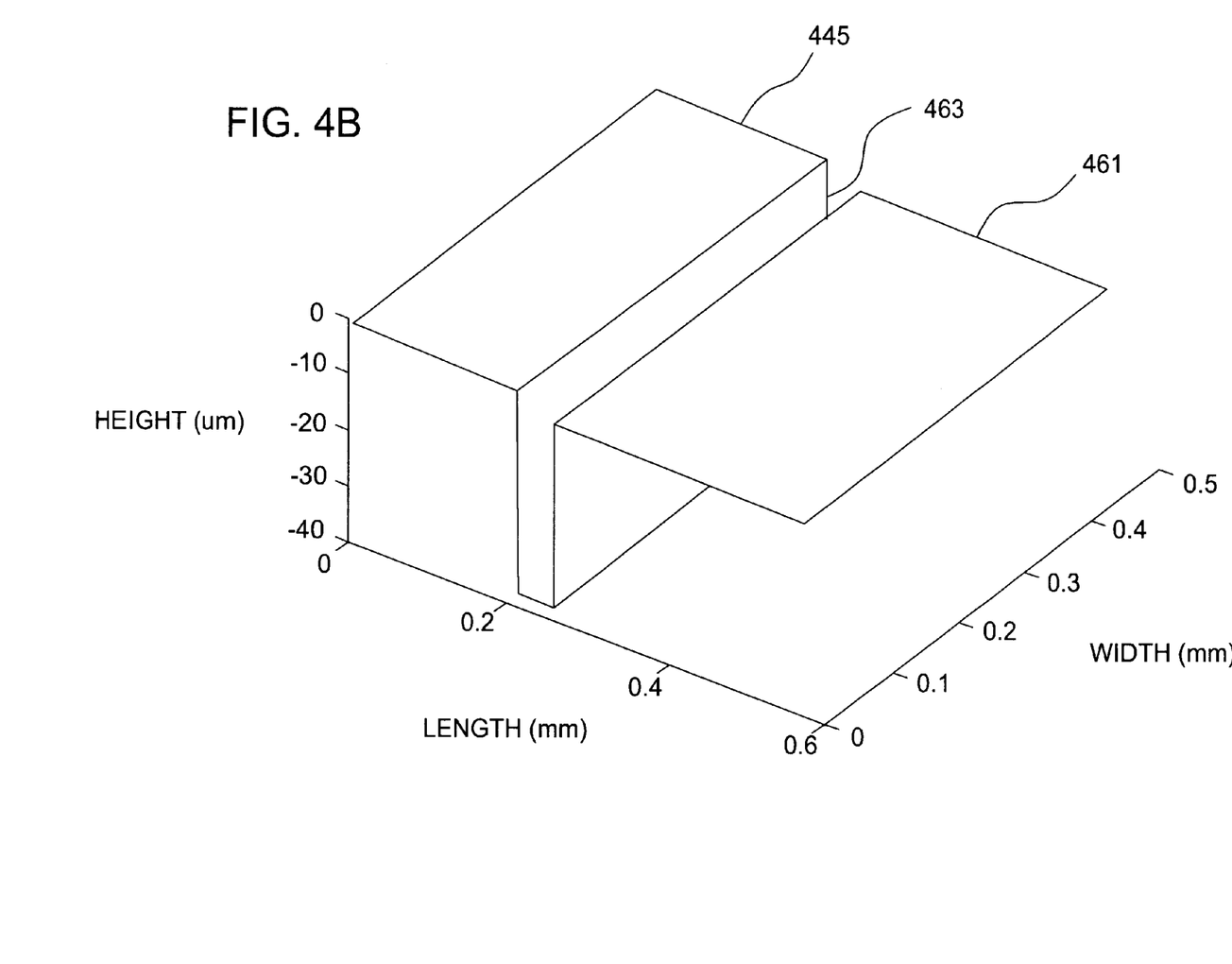
FIG. 4B is a partial perspective view of the prior art slider of FIG. 4A.
Figure 4C:
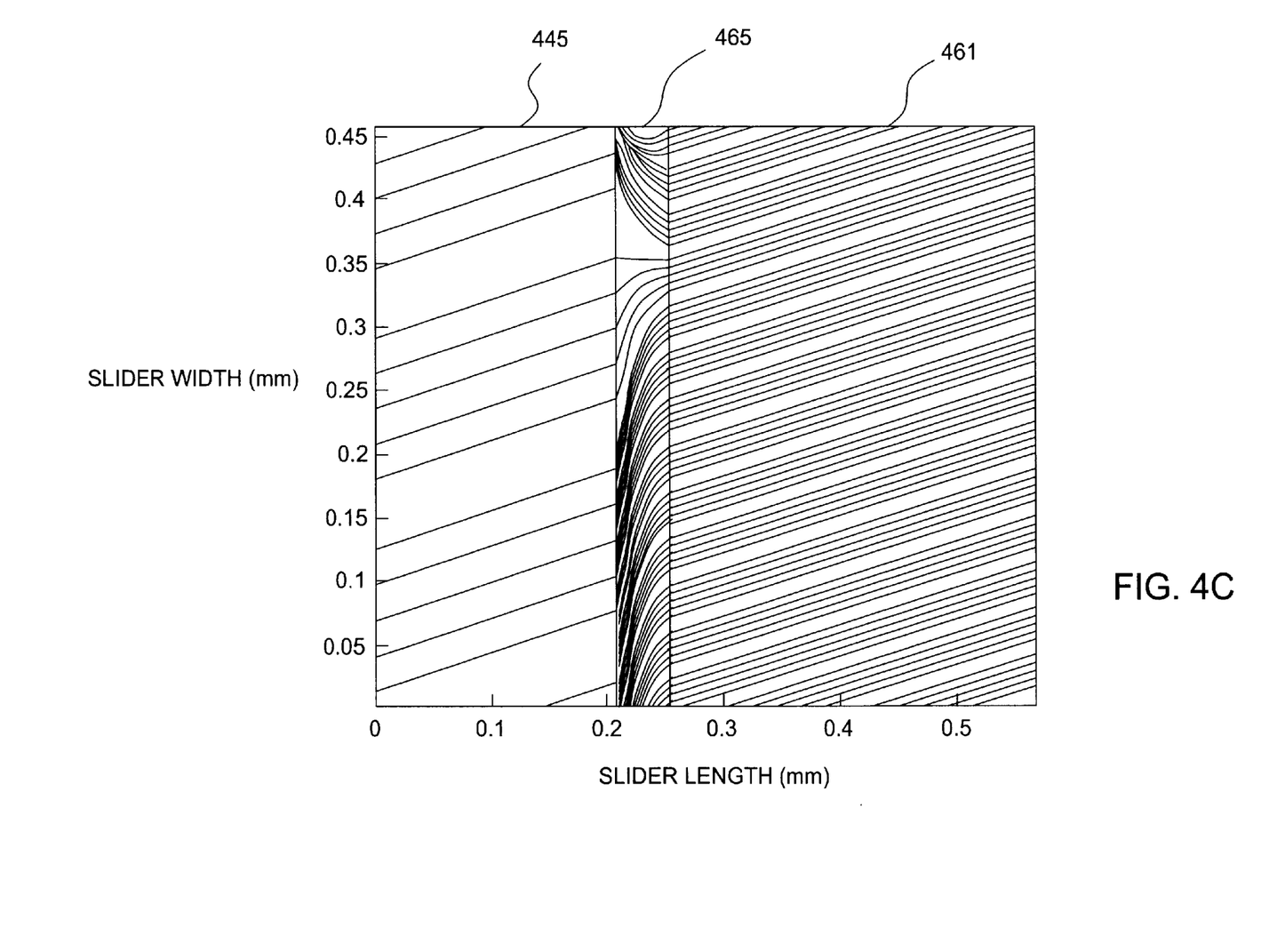
FIG. 4C is a diagram illustrating the air flow under the mounting platform of FIG. 4B.

FIG. 4A shows the bottom of a slider body 444 having a leading edge and a trailing edge and an air bearing surface 449 of the type shown in FIG. 3. The slider body 444 includes two rails 445, 447 which support the slider body to fly over the surface of the disc (not shown). The slider body supports an optical coupler system as previously described including a magnetic coil 460 supported on a platform 461 and having a center opening 463 therein through which the light beam is focused on the surface of the disc. This platform 461 is aligned behind one of the rails 445 and is of substantially the same height over the disc surface, all as shown in FIG. 4B. A recess 465 as is already well known in this field and of a depth of about 30–40 microns from the bottom surface of the rail 445 separates the rail 445 from the platform 461. This results in air flow patterns substantially as shown in FIG. 4C. As can be seen, the gap 465 causes the air current which has traveled outside the rail 445 to fill in behind the rail, and pass over the surface of the coil support platform 461. Therefore, any particles which have been closely following this air flow field now will flow over the coil region 460 and the gap 463. This could then cause a particle accumulation in the coil lens area 460, 463 due to flying the slider 444 over a non-defect free disc and possibly picking up both particles and lubrication. This could be a critical issue in long-term head reliability for magneto-optical heads, as the accumulation of such particles and/or lubrication or a combination thereof can render the light path diffused or obscured.

Figure 5A:
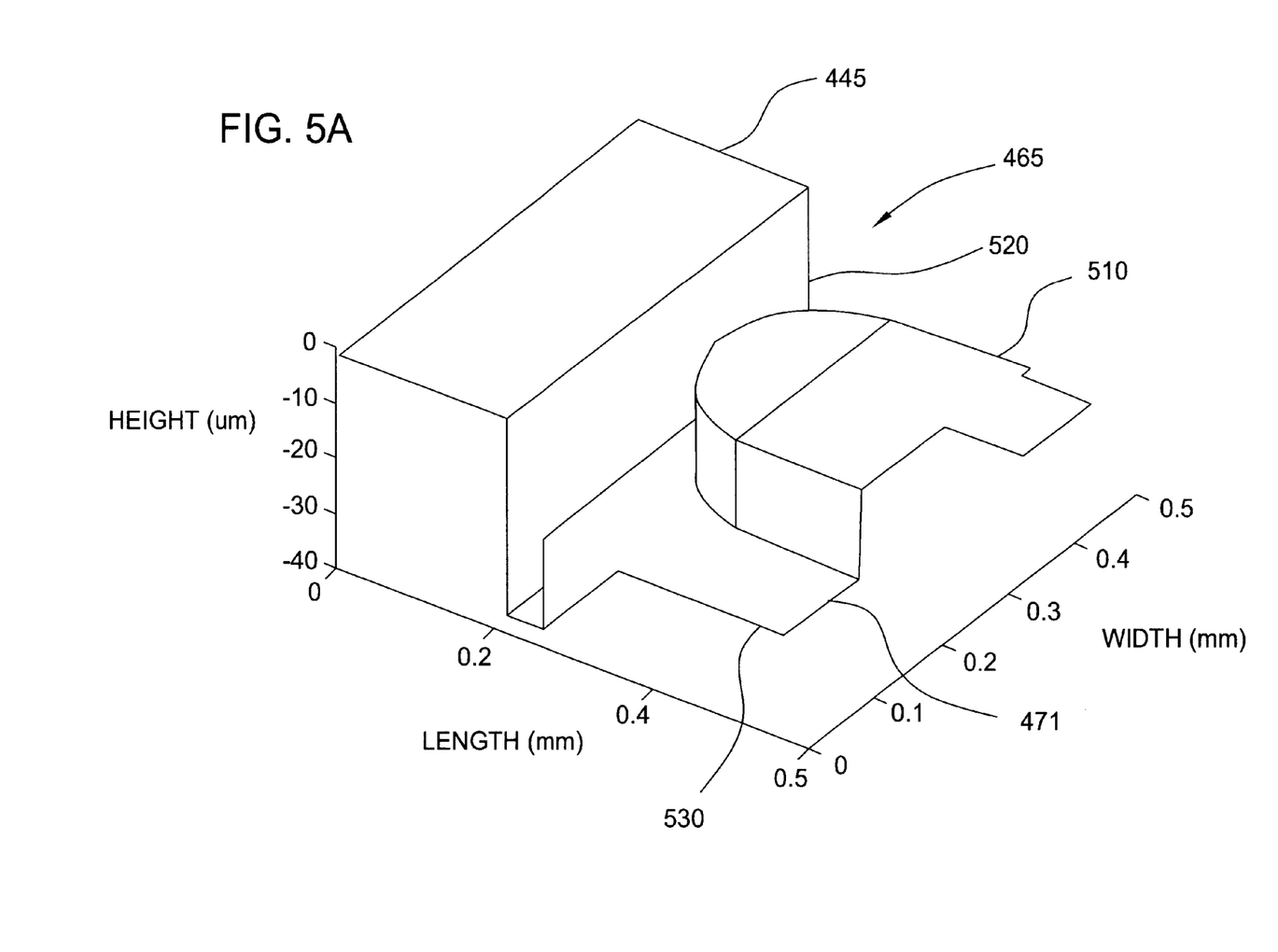
FIG. 5A is a partial view of the slider of FIG. 4 as modified to incorporate the present invention.
Figure 5B:
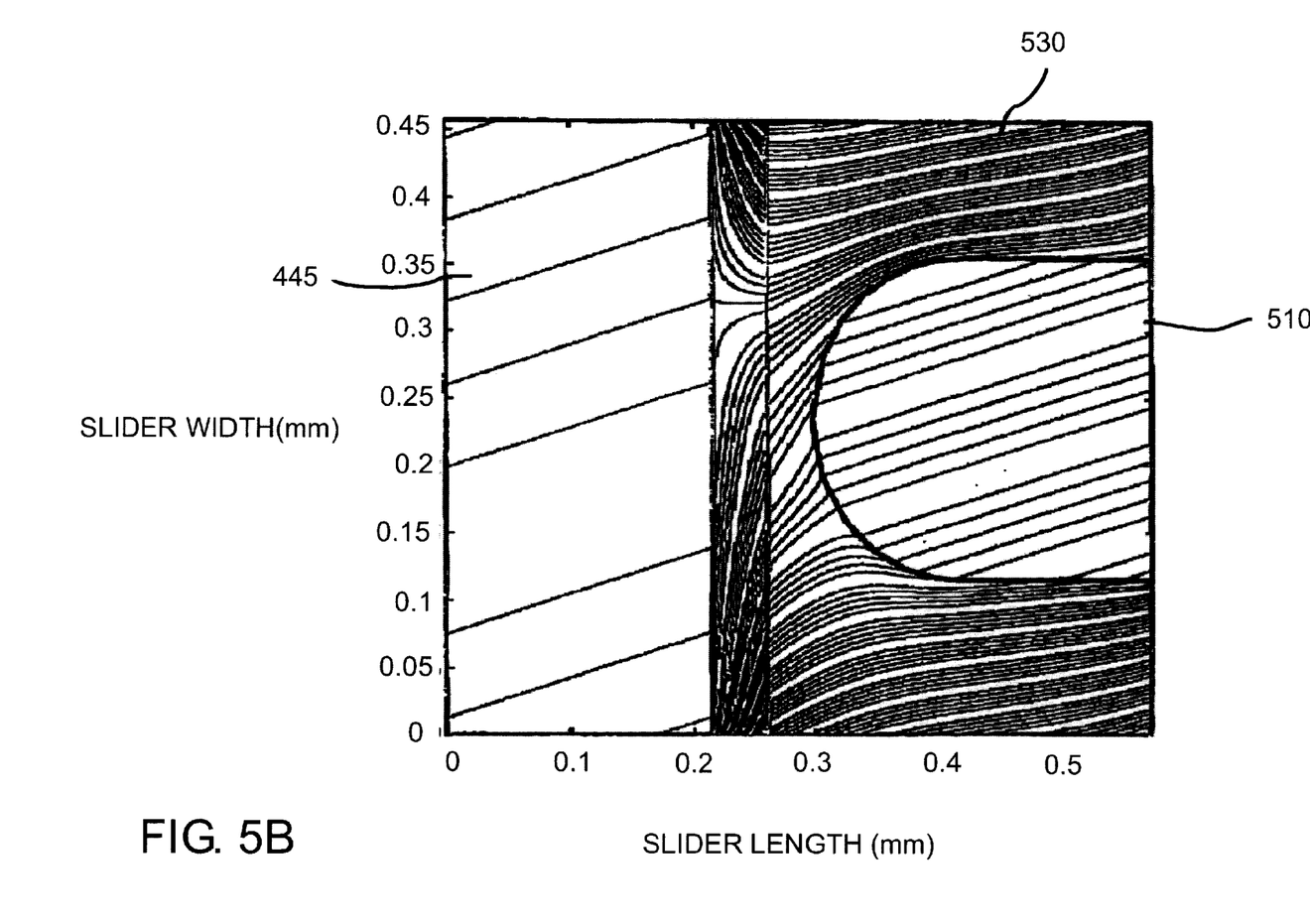
FIG. 5B is a diagram of the air flow under the optics support platform of the present invention.

Therefore, the approach taken by the present invention is to channel the air flow away from the coil lens area by slightly recessing the surface area surrounding the coil support platform. This recess would be provided in the region extending from the recess 465 to the trailing end 471 of the platform. A specific example of the approach is shown in FIG. 5A. In this figure, the coil is supported in a semi-oval or semicircular region 510 which is below the surface of the rail 445. The oval or circular end 520 of the platform faces the rear of the rail 445, across the gap 465. To provide the desired air circulation, the raised platform 510 is raised above the remainder of the platform 530 by a small difference in height. In this particular example, difference in height is about 8 micron meters. The remainder of the platform is at least as wide as the width of the rail 445. By reference to FIG. 5B, the dimensions of the platform semi-oval or semi-circle 510 relative to the rail 445 become apparent. For example, for a rail width of 0.45 mm, the coil support platform 510 has a width of about 0.24 mm, or about ½ or slightly more of the width of the rail. It can be seen that the lower platform 530 surrounds the semi-oval coil support platform 510 on all three sides, and that the coil support platform 510 is radially centered in the major lower platform 530. The air flow pattern is plotted using the streamline, with the denser lines indicating the higher flow rates. It can also be seen from the lines representing air flow, that the vast majority of the air flow is across the lower platform 530. By recessing this surrounding platform surface 530, the air flow in the coil area over the coil support platform is substantially reduced, minimizing the number of particles collected by the coil/lens.

Other features and advantages of the present invention may become apparent to a person of skill in the art who studies the present invention disclosure. Therefore, the scope of the present invention is to be limited only by the following claims.

What is claimed is:

1. An air bearing slider configuration for supporting optical elements including a coil defining a light output region adjacent a rotating disc and supported on an actuator to selectively move the optical elements and said slider from track to track between an inner diameter and an outer diameter of said disc while limiting contact of said light output region with particles or lubricants, including, wherein the slider has a leading edge and a trailing edge relative to the track and comprises first and second separate rails extending from said leading edge toward said trailing edge, a platform for supporting said optical elements located spaced from a trailing edge of only one of said rails, said platform having a curved profile located behind the one rail to cause air flow under said slider to be primarily diverted around said optical elements supported on said platform.

2. A slider as claimed in claim 1 wherein said curved platform supporting said optical elements is separated by a small gap from said trailing edge of said rail.

3. A slider as claimed in claim 1 wherein said curved platform is about one-half the width of said rail.

4. A slider as claimed in claim 3 wherein said curved platform is semi-circular in shape.

5. A slider as claimed in claim 3 wherein said curved platform is semi-oval in shape.

6. A slider as claimed in claim 1 wherein said diverted air flow is primarily air flow under said one of said slider rails.

7. A slider as claimed in claim 1 wherein said air flow under said platform is substantially less than the air flow around the sides of said platform.

8. A slider as claimed in claim 1 wherein said optical support platform is supported on a substantially rectangular platform spaced by a small recess from a trailing edge of said rail.

9. A slider as claimed in claim 8 wherein said slider rail has a bottom, air flow support surface which is further from a body of said slider than a bottom surface of said platform.

10. A magneto-optical recording system comprising at least one disc supported for rotation, an actuator arm supported for rotation about a pivot adjacent said disc, said arm supporting at least a part of a voice coil motor on an end of said arm distal from said disc and a transducer carried on a slider to move from track to track over a surface of said disc, said slider has a leading edge and a trailing edge relative to the track and comprises first and second rails extending from said leading edge toward said trailing edge, a platform for supporting said optical elements located spaced from a trailing edge of only one of said rails, said platform having a curved profile defined behind the one rail to cause air flow under said slider to be primarily diverted around said optical elements supported on said platform.

11. A slider as claimed in claim 10 wherein said curved platform supporting said optical elements is separated by a small gap from said trailing edge of said rail.

12. A slider as claimed in claim 11 wherein said curved platform is about one-half the width of said rail.

13. A slider as claimed in claim 12 wherein said diverted air flow is primarily air flow under said one of said slider rails.

14. A slider as claimed in claim 13 wherein said air flow under said platform is substantially less than the air flow around the sides of said platform.

15. A slider as claimed in claim 14 wherein said optical support platform is supported on a substantially rectangular platform spaced by a small recess from a trailing edge of said rail.

16. A slider as claimed in claim 14 wherein said slider rail has a bottom, air flow support surface which is further from a body of said slider than a bottom surface of said platform.

17. A slider as claimed in claim 16 wherein said curved platform is semi-circular in shape.

18. A slider as claimed in claim 14 wherein said curved platform is semi-oval in shape.

19. A magneto-optical recording system comprising at least one disc supported for rotation, an actuator arm supported for rotation about a pivot adjacent said disc, said arm supporting at least a part of a voice coil motor on an end of said arm distal from said disc and a transducer carried on a slider to move from track to track over a surface of said disc, including first and second rails supporting said slider to fly over a surface of said disc, and means located to the rear of one of said rails for supporting means including a lens for accessing data stored on said tracks of said disc and further including means for defecting air flow under said one rail away from said lens to prevent debris from clouding said lens, wherein said means for defecting air flow comprising a platform for supporting the optical elements located spaced from a trailing edge of only one of said rails, said platform having a curved profile located behind the one rail to cause air flow under said slider to be primarily diverted around said optical elements supported on said platform.

\* \* \* \* \*

UNITED STATES PATENT AND TRADEMARK OFFICE
CERTIFICATE OF CORRECTION

PATENT NO. : 6,574,190 B1
APPLICATION NO. : 09/270812
DATED : June 3, 2003
INVENTOR(S) : Hu

It is certified that error appears in the above-identified patent and that said Letters Patent is hereby corrected as shown below:

On the Title Page, item (73) should read

--Seagate Technology LLC, Scotts Valley, CA (US)--

Signed and Sealed this

Eighth Day of April, 2008

JON W. DUDAS
*Director of the United States Patent and Trademark Office*